US011972919B2

(12) United States Patent
Lu et al.

(10) Patent No.: US 11,972,919 B2
(45) Date of Patent: Apr. 30, 2024

(54) PLUG-IN CIRCUIT BREAKER

(71) Applicant: ZHEJIANG CHINT ELECTRICS CO., LTD., Zhejiang (CN)

(72) Inventors: Kejun Lu, Zhejiang (CN); Xiangyi Gu, Zhejiang (CN); An Yang, Zhejiang (CN); Jun Zhu, Zhejiang (CN); Shaojun Guo, Zhejiang (CN)

(73) Assignee: ZHEJIANG CHINT ELECTRICS CO., LTD. (CN)

( * ) Notice: Subject to any disclaimer, the term of this patent is extended or adjusted under 35 U.S.C. 154(b) by 0 days.

(21) Appl. No.: 17/776,169

(22) PCT Filed: Nov. 14, 2020

(86) PCT No.: PCT/CN2020/128874
§ 371 (c)(1),
(2) Date: May 11, 2022

(87) PCT Pub. No.: WO2021/093875
PCT Pub. Date: May 20, 2021

(65) Prior Publication Data

US 2022/0406536 A1 Dec. 22, 2022

(30) Foreign Application Priority Data

Nov. 15, 2019 (CN) ......................... 201911122568.X

(51) Int. Cl.
*H01H 9/20* (2006.01)
*H01H 13/14* (2006.01)

(52) U.S. Cl.
CPC .............. *H01H 9/20* (2013.01); *H01H 13/14* (2013.01)

(58) Field of Classification Search
CPC .......... H01H 9/20; H01H 13/14; H01H 71/58; H01H 73/08; H01H 71/08; H01H 71/505;
(Continued)

(56) References Cited

U.S. PATENT DOCUMENTS 6,480,079 B1 11/2002 Bentley et al. ................... 335/6
2022/0068580 A1* 3/2022 Lu ...................... H01H 71/0207
(Continued)

FOREIGN PATENT DOCUMENTS

CN 109585233 A 4/2019
CN 209487441 U 10/2019
(Continued)

OTHER PUBLICATIONS

International Search Report mailed Feb. 20, 2021 in corresponding PCT International Application No. PCT/CN2020/128874.
(Continued)

*Primary Examiner* — Lheiren Mae A Caroc
(74) *Attorney, Agent, or Firm* — OSTROLENK FABER LLP

(57) ABSTRACT

A plug-in circuit breaker that includes a housing with a limiting hole, a button mechanism having a closing position and an opening position, and an operating mechanism actuated by the button mechanism. The plug-in circuit breaker includes a locking member arranged inside the housing. The locking member has a locking protruding stand opposite the limiting hole. When the button mechanism is in the closing position, the locking protruding stand of the locking member extends out of the limiting hole and limited by the button mechanism. When the button mechanism is in the opening position, the locking protruding stand of the locking member extends out of the limiting hole to apply an external force on the locking member for retraction. The locking protruding stand of the locking member can retract into the housing, and the locking member limits the button mechanism to perform the closing operation.

10 Claims, 5 Drawing Sheets

(58) Field of Classification Search
CPC ............. H01H 2071/046; H01H 71/04; H01H 71/1009; H01H 71/52; H01H 9/22; H01H 9/223; H01H 9/28; H01H 71/10
See application file for complete search history.

(56) References Cited

U.S. PATENT DOCUMENTS

| | | | | |
|---|---|---|---|---|
| 2022/0084770 | A1* | 3/2022 | Lu | H01H 71/58 |
| 2022/0415600 | A1* | 12/2022 | Lu | H01H 71/1009 |

FOREIGN PATENT DOCUMENTS

| | | | |
|---|---|---|---|
| CN | 110400727 | A | 11/2019 |
| CN | 111477512 | A | 7/2020 |
| EP | 0849759 | A1 | 6/1998 |

OTHER PUBLICATIONS

Written Opinion mailed Feb. 20, 2021 in corresponding PCT International Application No. PCT/CN2020/128874.

* cited by examiner

PLUG-IN CIRCUIT BREAKER

CROSS-REFERENCE TO RELATED APPLICATIONS

The present application is a 35 U.S.C. §§ 371 national stage application of International Application No. PCT/CN2020/128874, filed Nov. 14, 2020, which claims priority to Chinese Patent Application No. 201911122568.X, filed Nov. 15, 2019, the contents of both of which are incorporated herein by reference.

FIELD OF THE INVENTION

The invention relates to the field of low-voltage electrical appliances, in particular to a plug-in circuit breaker.

BACKGROUND OF THE INVENTION

With the rapid development of the network communication technology, especially the application and popularization of 5G networks, the circuit breaker is required to effectively improve the safety of electrical equipment more and more highly, but the traditional terminal circuit breaker required to connect a plurality of sockets and plug-in boards in traditional power supply mode is far less likely to meet the requirements of electric safety and equipment protection. The terminal circuit breakers used in 5G communication equipment not only are expected to improve the performance in miniaturization, intelligence, reliability, stability and the like, but also have developed a lot of new mating structures in use requirements, such as, convenient plug-in and plug-out operations like receptacle plugs and capability to be locked at the installation position, of circuit breakers, which are novel circuit breakers referred to as plug-in circuit breakers. The novel plug-in circuit breakers not only can provide various safety protection performance of a circuit breaker for power line and electrical equipment, but also can meet the requirements of various electric appliance on the power supply quality, enabling circuit breakers to be conveniently connected/disconnected to a circuit in a plug-in and plug-out mode.

Existing plug-in circuit breakers are usually provided with a locking apparatus, the locking protrusion of which extends out of the circuit breaker housing, when the circuit breaker is in a closing state, preventing the circuit breakers from being inserted or pulled out in the closing state, but the existing locking apparatus has a large number of parts and a complex structure, not facilitating the miniaturization design and the reliability of circuit breakers.

SUMMARY OF THE INVENTION

The present invention aims to provide a plug-in circuit breaker with a simple structure and high reliability.

In order to achieve the above object, the present invention adopts the following technical solutions:

A plug-in circuit breaker comprising a housing providing with a limiting hole, a button mechanism having a closing position and a opening position corresponding to a closing state and a opening state, and an operating mechanism actuated by the button mechanism to perform the closing/opening operation, the plug-in circuit breaker includes a locking member arranged inside the housing, the locking member is provided with a locking protruding stand opposite to the limiting hole, when the button mechanism is in the closing position, the locking protruding stand of the locking member extending out of the limiting hole and limited by the button mechanism cannot retract into the housing; when the button mechanism is in the opening position, the locking protruding stand of the locking member extends out of the limiting hole, applying an external force on the locking member for retraction, thus the locking protruding stand of the locking member can retract into the housing, and the locking member limits the button mechanism to perform the closing/opening operation, so that the circuit breaker cannot be closed.

Preferably, the locking member is installed inside the housing in a linear movement mode, the direction of the linear movement thereof is perpendicular to the installation-insertion direction of the circuit breaker, an elastic member is connected between the locking member and the housing, the elastic force of the elastic member actuates the locking protruding stand of the locking member to extend out of the housing, when the button mechanism is in the opening position, an external force for retraction is applied on the locking member, so that the locking member overcomes the elastic force of the elastic member to retract the locking protruding stand into the housing.

Preferably, the button mechanism includes a button, a connecting rod and a driving member, the button activates the driving member to act by means of the connecting rod, the driving member is rotatably arranged inside the housing and connected with the operating mechanism.

Preferably, the locking member is provided with a limiting end, the driving member is provided with a limiting surface, when the button mechanism is in the closing position, the limiting surface abuts against the limiting end, so that the locking protruding stand of the locking member cannot retract into the housing; when the button mechanism is in the opening position, the limiting surface is dislocated off the limiting end to release hindrance fit, when an external force is applied to the locking member, the locking protruding stand of the locking member retracts into the housing.

Preferably, the locking member is provided with a limiting end, the driving member is further provided with a driving limiting portion, when the button mechanism is in the opening position, the driving limiting portion is opposite to the limiting end, when the locking protruding stand of the locking member retracts into the housing, the limiting end is in limit fit with the driving limiting portion to hinder the driving member from rotating in the closing direction, so as to prevent the button mechanism from switching from the opening position to the closing position.

Preferably, the plug-in circuit breaker further includes an unlocking member, the unlocking member is provided with an unlocking portion fitting with the locking member, after the circuit breaker is opened, continuing to pull the button enables the button mechanism to actuate the unlocking member to act, the unlocking portion of the unlocking member applies a force to the locking member to retract the locking protruding stand into the housing.

Preferably, an unlocking arm fitting with the locking member is arranged on the button, after the circuit breaker is opened, the button is continuously pulled, so that the unlocking arm applies a force to the locking member to retract the locking protruding stand into the housing.

Preferably, the upper portion of the locking member close to the limiting hole is provided with the locking protruding stand, and the lower portion of the locking member close to the button mechanism is provided with the limiting end extending downwards, a linkage unlocking portion is arranged on one side of the locking protruding stand.

Preferably, the unlocking member is rotatably arranged inside the housing, the unlocking member is provided with the unlocking portion fitting with the locking member in the direction pointing to the locking member, the other end of the unlocking member is provided with a bending end, thus the button mechanism actuates the unlocking member to rotate by means of the bending end, so as to enable the unlocking portion to apply a force to the locking member, so that the locking protruding stand retracts into the housing.

Preferably, the button includes a button member used for operation and an indicating member inside the button member, the indicating member includes a rotating shaft, a display end surface, and a driving protruding stand arranged on the rotating shaft, the display end surface is provided with an indicating portion used for identifying the closing and opening, the inside of the button member is internally provided with a cavitated installing hole, the operation end face of the button member is provided with an observation window communicating with the installing hole, the indicating member is installed inside the installing hole of the button member by means of the rotating shaft and can swing around the shaft, such swinging action drives the indicating portion on the display end surface to move under the observation window, the corresponding closing and opening state are indicated by moving the indicating portion into the observation window, the driving protruding stand reveals the outer side of the button member, the unlocking member is provided with the corresponding bending end, the bending direction of the bending end faces one side of the driving protruding stand of the indicating member; during the circuit breaker closing, the button moves toward inside of the housing, and the driving protruding stand fits with the bending end, enabling the indicating member to rotate, so that the region of the indicating portion on the display end surface corresponding to the closing state faces the observation window; after the circuit breaker is opened, the button is pulled away from the circuit breaker, the driving protruding stand actuates the unlocking member to rotate by means of the bending end, so that the unlocking portion applies a force to the locking member to retract the locking protruding stand into the housing.

The plug-in circuit breaker according to the present invention is provided with a locking member, when the button mechanism is in the closing position, the locking protruding stand of the locking member extends out of the limiting hole and is limited by the button mechanism and cannot retract into the housing, so that the circuit breaker cannot be inserted into the cabinet in the closing state or cannot be pulled out after being installed to the operating position of the cabinet. In addition, when the button mechanism is in the opening position, the locking protruding stand of the locking member extends out of the limiting hole, so that it can protect the circuit breaker from falling out of the cabinet with vibration during transportation process, furthermore an external force is applied on the locking protruding stand to retract the locking member in the opening state, thus the locking protruding stand can retract into the housing, meanwhile the locking member limits the closing operation of the button mechanism, so that the plug-in circuit breaker can be normally inserted into the operating position of the cabinet, and the button mechanism cannot complete the closing action without installation into the correct operating position during the insertion process. In this way, multiple protection is achieved by means of one locking member, and only when the circuit breaker is mounted to the correct position, the button mechanism can be normally switched between the opening position and the closing position, moreover has a simple structure and high reliability.

In addition, the plug-in circuit breaker of the present invention is further provided with an unlocking member, which is actuated by the button mechanism. If the circuit breaker is desired to be pulled out from the cabinet after opening, the button mechanism applies a force to the locking member by the unlocking member to retract the locking protruding stand into the housing, so that the circuit breaker can be pulled out.

DETAILED DESCRIPTION OF SOME EMBODIMENTS

We further describe the embodiments of the plug-in circuit breaker according to the present invention as follows in combination with the examples shown in FIGS. 1-8. The plug-in circuit breaker of the present invention is not limited to the description of the following embodiments.

Figure 1:
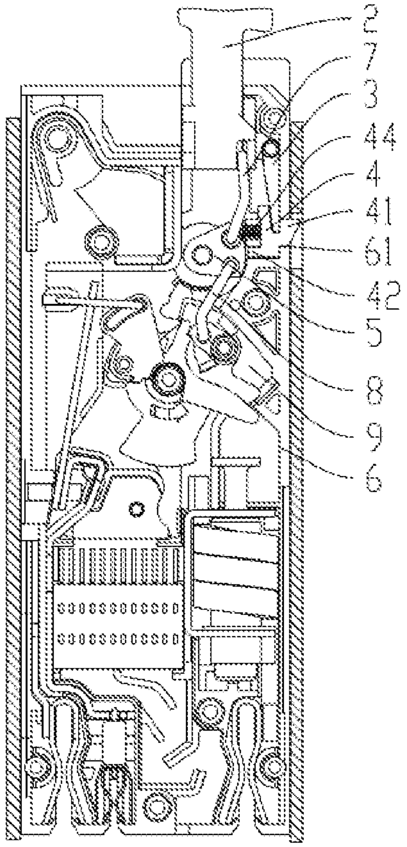
FIG. 1 is an overall structure view of the plug-in circuit breaker of the present invention in the operating position of the cabinet.

As shown in FIG. 1, the plug-in circuit breaker of the present invention comprises the housing 6, the button mechanism, the operating mechanism 9 drivingly connected with the button mechanism, the movable contact connected with the operating mechanism 9, and the stationary contact arranged opposite to the movable contact, moreover, generally includes, but is not limited to, a short-circuit protection mechanism, an arc extinguishing apparatus, an overload protection mechanism, a wire-outlet connecting apparatus, a wire-inlet connecting apparatus and other components of circuit breakers (not shown). The button mechanism actuates the operating mechanism 9 to activate the movable contact in contact with the stationary contact to perform the closing operation, or actuates the operating mechanism 9 to activate the movable contact off the stationary contact to perform the opening operation, and the button mechanism has a closing position and a opening position corresponding to a closing state and a opening state.

A locking apparatus is further arranged inside the plug-in circuit breaker, the limiting hole 61 fitting with the locking apparatus is arranged on the housing 6, and a cabinet limiting hole is formed on the sheet metal part of the operating position of the cabinet with the plug-in circuit breaker inserted thereinto (see FIG. 1). When the plug-in circuit breaker is mounted to the operating position, the limiting hole 61 of the plug-in circuit breaker corresponds to the cabinet limiting hole B0, and when the plug-in circuit breaker is not installed to the operating position, the limiting hole 61 of the plug-in circuit breaker is dislocated off the cabinet limiting hole B0, so the cabinet sheet metal part B shields the cabinet limiting hole B0, as it pertains to the prior art, details for it are not described herein again.

As shown in FIG. 1, an embodiment of the plug-in circuit breaker of the present invention comprises the housing 6 provided with the limiting hole 61, a button mechanism and the operating mechanism 9, wherein the button mechanism actuates the operating mechanism 9 to perform the closing operation and the opening operation, and the button mechanism has the closing position and the opening position corresponding to the closing state and the opening state. The button mechanism includes the button 2, the connecting rod 7 and the driving member 5, wherein the button 2 activates the driving member 5 to act by means of the connecting rod 7, the driving member 5 is rotatably arranged inside the housing 6 and connected with the operating mechanism 9. Pressing the button 2 actuates the driving member 5 to rotate towards one side by means of the connecting rod 7, and the driving member 5 actuates the operating mechanism 9 to activate the movable contact and the stationary contact to contact with each other by means of the U-shaped rod 8, to realize the closing of the circuit breaker. Pulling out the button 2 actuates the driving member 5 to rotate towards the other side by means of the connecting rod 7, and the driving member 5 actuates the operating mechanism 9 to activate the movable contact and the stationary contact to break contact with each other by means of the U-shaped rod 8, to realize the opening of the circuit breaker. The driving member 5 acts as a handle with functions similar to that of conventional small circuit breakers, the operating mechanism usually comprises a contact support connected with the movable contact, a lock catch, and a jump buckle, the short-circuit protection mechanism and the overload protection mechanism are correspondingly arranged with the lock catch of the operating mechanism; when a short-circuit fault or an overload fault occurs, acting on the jump buckle enables the operating mechanism to trip off, so that the circuit breaker enters the opening state for protection.

The present invention has an improvement on that the circuit breaker further includes the locking apparatus fitting with the limiting hole 61, the locking apparatus includes the locking member 4 arranged inside the housing 6, the locking member 4 is provided with the locking protruding stand 41 opposite to the limiting hole 61. When the button mechanism is in the closing position, the locking protruding stand 41 of the locking member 4 extending out of the limiting hole 61 and limited by the button mechanism cannot retract into the housing 6. When the button mechanism is in the opening position, the locking protruding stand 41 of the locking member 4 extends out of the limiting hole 61, applying an external force on the locking member 4 for retraction, thus the locking protruding stand 41 of the locking member 4 can retract into the housing 6, and the locking member 4 limits the button mechanism to perform the closing operation, so that the circuit breaker cannot complete the closing action.

The plug-in circuit breaker of the present invention is provided with a locking member. When the button mechanism is in the closing position, the locking protruding stand of the locking member extending out of the limiting hole and limited by the button mechanism cannot retract into the housing, so that the circuit breaker cannot be inserted into the cabinet in the closing state or cannot be pulled out after being installed to the operating position of the cabinet. In addition, when the button mechanism is in the opening position, the locking protruding stand of the locking member extends out of the limiting hole, so that it can protect the circuit breaker from falling out of the cabinet with vibration during transportation process, furthermore an external force is applied on the locking protruding stand to retract the locking member in the opening state, thus the locking protruding stand can retract into the housing, meanwhile the locking member limits the closing operation of the button mechanism, so that the plug-in circuit breaker can be normally inserted into the operating position of the cabinet, and the button mechanism cannot complete the closing action without installation into the correct operating position during the insertion process. In this way, multiple protection is achieved by means of one locking member, and only when the circuit breaker is mounted to the correct position, the button mechanism can be normally switched between the closing opening position and the closing position, moreover has a simple structure and high reliability.

As shown in FIG. 1, the locking member 4 is installed inside the housing 6 in a linear movement mode, the direction of the linear movement thereof is perpendicular to the installation-insertion direction of the circuit breaker, the elastic member 44 is connected between the locking member 4 and the housing 6, and the elastic force of the elastic member 44 actuates the locking protruding stand 41 of the locking member 4 to extend out of the housing 6. When the button mechanism is in the opening position, the locking member 4 is in a freely retractable position so as to facilitate easy insertion of the circuit breaker into the cabinet. An external force for retraction is applied on the locking member 4, so that the locking member 4 overcomes the elastic force of the elastic member 44 to retract the locking protruding stand 41 into the housing 6, meanwhile the locking member 4 limits the button mechanism to perform the closing operation, so that the circuit breaker cannot complete the closing action.

Figure 2:
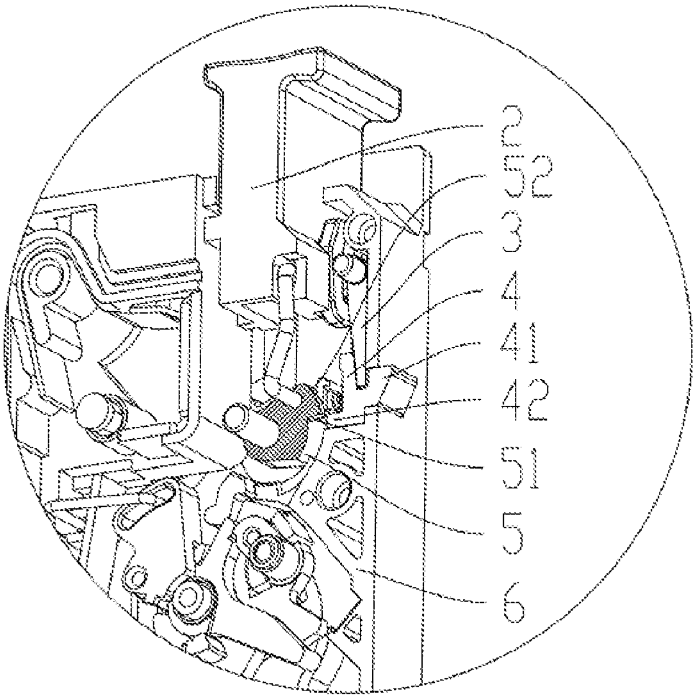
FIG. 2 is a partial enlarged view of the button mechanism, the driving member, the locking member and the unlocking member in the opening state.
Figure 3:
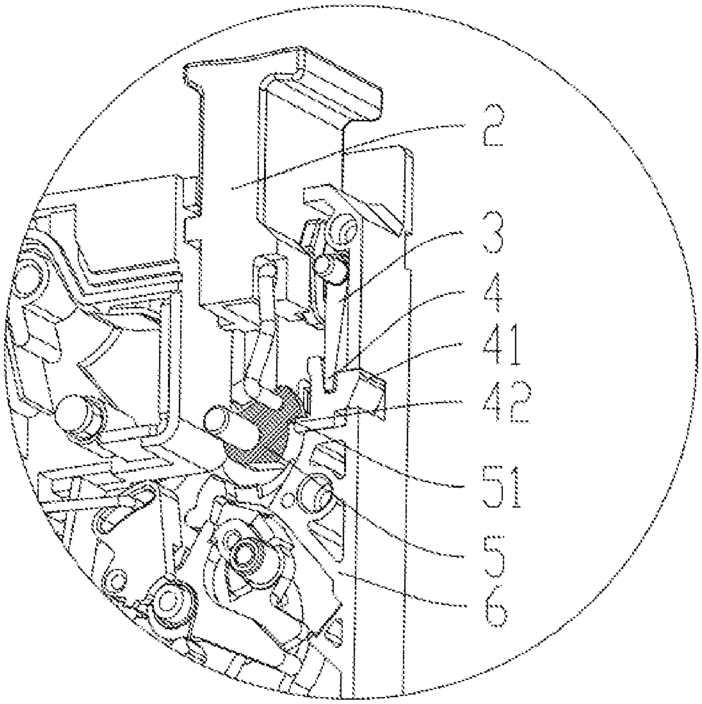
FIG. 3 is a partial enlarged view of the locking member retracting into the housing under a force in the opening state.

As shown in FIGS. 2 and 3, the upper portion of the locking member 4 close to the limiting hole 61 is provided with the locking protruding stand 41, and the lower portion of the locking member 4 close to the button mechanism is provided with the limiting end 42 extending downwards. When the button mechanism is in the opening position, the driving limiting portion 51 is opposite to the limiting end 42 (see FIG. 2), at this time the driving limiting portion 51 and the limiting end 42 are not in limit contact with each other, so the circuit breaker can be normally switched between the closing and opening. When the locking protruding stand 41 of the locking member 4 retracts into the housing 6, the limiting end 42 is in limit fit with the driving limiting portion 51 (see FIG. 3). The driving limiting portion 51 is shaped into a step, the limiting end 42 extends into one side of the step to hinder the driving member 5 from rotating in the closing direction, so as to prevent the button mechanism from switching from the opening position to the closing position, at this time the circuit breaker cannot enter the closing state.

As shown in FIG. 2, the driving member 5 is further provided with the limiting surface 52, when the button mechanism is in the closing position, the limiting surface 52 abuts against the limiting end 42, so that the locking protruding stand 41 of the locking member 4 cannot retract into the housing 6. When the button mechanism is in the opening position, the limiting end 42 is opposite to the driving limiting portion 51, the limiting surface 52 is dislocated off the limiting end 42 to release hindrance fit, and when an external force is applied to the locking member 4, the locking protruding stand 41 of the locking member 4 can retract into the housing 6.

Preferably, the cross section of the locking protruding stand 41 of the locking member 4 is shaped into a right-angled trapezoid or a right-angled triangle, the locking protruding stand 41 includes a straight surface and an inclined surface, the straight surface faces the plug-out direction of the circuit breaker from the cabinet, and is perpendicular to the installation-insertion direction of the circuit breaker, and the inclined surface faces the insertion direction of the circuit breaker into the cabinet. In this embodiment, the driving limiting portion 51 is a step arranged on the side wall of the driving member 5, obviously, the driving member 5 may also be a groove or protrusion, and other similar structures, and the limiting end 42 is a protruding limiting arm, certainly may also be a limiting groove or other structures. The elastic member 44 is a compression spring, certainly may also be an elastic member such as a torsion spring or other structures.

As shown in FIGS. 1-3, when the button mechanism is in the opening position, the locking member 4 is in a freely retractable position to facilitate easy insertion of the circuit breaker into the cabinet. During inserting the cabinet, when the circuit breaker is inserted into the cabinet but not installed to the normal operating position, the locking member 4 is limited by the cabinet to be in the retraction position, and the locking driving member 5. cannot to perform the closing operation, and only when the circuit breaker is installed to the correct position, the locking member 4 is in the extension position, so as to release the limit to the locking driving member 5, thus the button mechanism can perform the closing operation. If the circuit breaker is in the closing state, the locking member 4 is in the extension position and limited to the extension position by the driving member 5, as well as cannot retract to the retraction position, so as to ensure that the locking member of the circuit breaker is limited by the cabinet and cannot be installed in the cabinet or cannot be pulled out of the cabinet, when the circuit breaker is in the closing state.

In this embodiment, the locking member 4 is in limit fit with the driving member 5, and as another embodiment, the locking member 4 may also be in limit fit with the button 2 or the connecting rod 7. For example, the button 2 is provided with the limiting arm extending to the locking member 4 and fitting with the locking member 4, in the closing state, the limiting arm is opposite to the limiting end 42 of the locking member 4, so that the locking member 4 cannot retract into the housing; in the opening state, the locking member 4 retracts into the housing under a force, the limiting end 42 extends to one side of the limiting arm, so that the button 2 cannot move to the closing direction.

Further, the plug-in circuit breaker further includes the unlocking member 3, after the circuit breaker is opened, the button mechanism applies a force to the locking member through the unlocking member, so that the locking protruding stand retracts into the housing, thereby safely pulling out the circuit breaker from the cabinet. The unlocking member 3 is provided with the unlocking portion 31 fitting with the locking member 4, after the circuit breaker is opened, it continues to pull the button 2, the button mechanism actuates the unlocking member 3 to act, and the unlocking portion 31 of the unlocking member 3 applies a force to the locking member 4 to retract the locking protruding stand 41 into the housing 6. In another embodiment without single use of the unlocking member 3, an unlocking arm fitting with the locking member 4 may also be arranged on the button 2, and a corresponding driving bevel may be arranged on the unlocking arm, after the circuit breaker is opened, the button 2 is continuously pulled, so that the unlocking arm applies a force to the locking member 4 to retract the locking protruding stand 41 into the housing 6.

Figure 4:
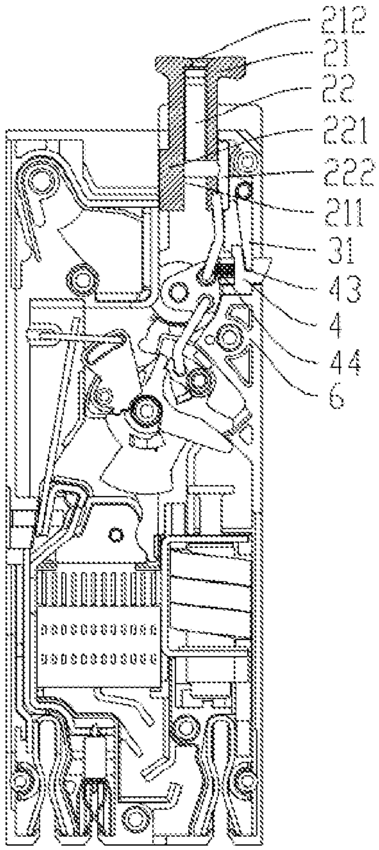
FIG. 4 is a structure view of the button mechanism, the unlocking member and the locking member in fit with each other.
Figure 5:
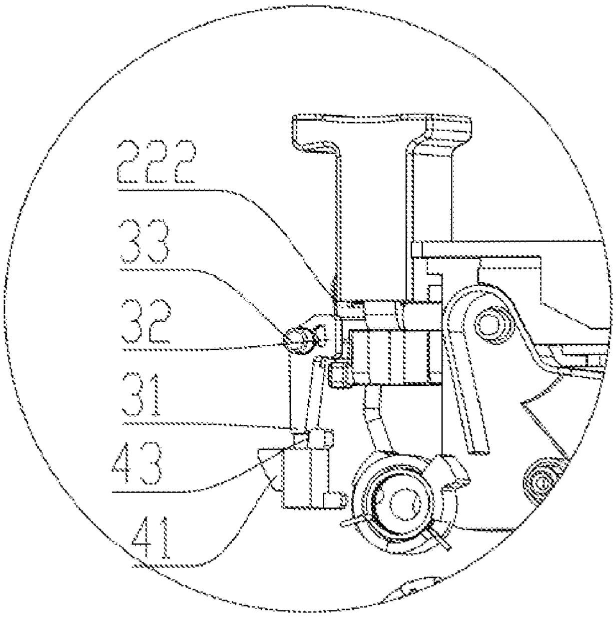
FIG. 5 is a partial enlarged view of the unlocking member and the locking member in Embodiment 1.
Figure 6:
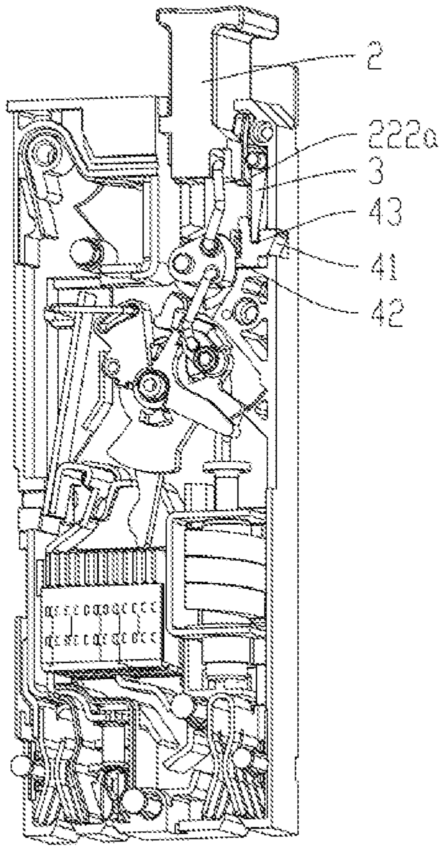
FIG. 6 is a partial enlarged view of the unlocking member and the locking member in Embodiment 2.

As shown in FIGS. 4-6, the unlocking member 3 is rotatably arranged inside the housing 6, the unlocking member 3 is provided with the unlocking portion 31 fitting with the locking member 4 in the direction pointing to the locking member 4, the locking member 4 is provided with the linkage unlocking portion 43 fitting with the unlocking portion 31, the other end of the unlocking member 3 is the bending end 32 bending toward the button mechanism, thus the button mechanism actuates the unlocking member 3 to rotate by means of the bending end 32, so as to enable the unlocking portion 31 to apply a force to the locking member 4, so that the locking protruding stand 41 retracts into the housing 6.

In an embodiment of the unlocking member 3 actuated by the button mechanism, the button 2 is provided with an unlocking protrusion, after the circuit breaker is opened, the button 2 is continuously pulled, the unlocking protrusion on the button 2 actuates the bending end 32, so that the unlocking member 3 rotates clockwise, and the unlocking portion 31 applies a force to the linkage unlocking portion 43 of the locking member 4, then the compression spring enables the locking protruding stand 41 to retract into the housing 6.

Figure 7:
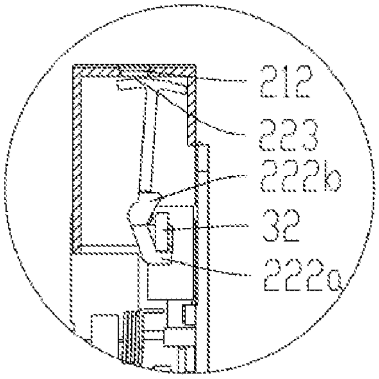
FIG. 7 is a partial enlarged view of the indicating member and the unlocking member in fit with each other in the opening state.
Figure 8:
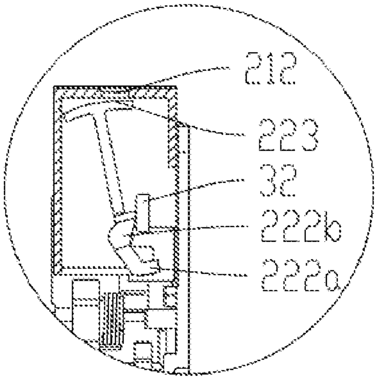
FIG. 8 is a partial enlarged view of the indicating member and the unlocking member in fit with each other in the closing state.

As shown in FIGS. 4 and 7-8, in a preferred embodiment, the indicating member 22 drives the unlocking member 3 to actuate the locking protruding stand 41 to retract into the housing 6. The button 2 includes the button member 21 used for operation and the indicating member 22 inside the button member 21, said indicating member 22 includes the rotating shaft 221, the display end surface 223, and the driving protruding stand 222 arranged on the rotating shaft 221, the display end surface 223 is provided with an indicating portion used for identifying the closing and opening. The inside of the button member 21 is internally provided with the cavitated installing hole 211, the operation end face of the button member 21 is provided with the observation window 212 communicating with the installing hole 211, the indicating member 22 is installed inside the installing hole 211 of the button member 21 by means of the rotating shaft 221 and can swing around the shaft, such swinging action drives the indicating portion on the display end surface 223 to move under the observation window 212, the corresponding closing and opening state are indicated by moving the indicating portion into the observation window 212. The driving protruding stand 222 reveals the outer side of the button member 21, the unlocking member 3 is provided with the corresponding bending end 32, and the bending direction of the bending end 32 faces one side of the driving protruding stand 222 of the indicating member 22. During the circuit breaker closing, the button 2 moves toward inside of the housing 6, and the driving protruding stand 222 fits with the bending end 32, enabling the indicating member 22 to rotate, so that the region of the indicating portion on the display end surface 223 corresponding to the closing state faces the observation window 212. After the circuit breaker is opened, the button 2 is pulled away from the circuit breaker, the driving protruding stand 222 actuates the unlocking member 3 to rotate by means of the bending end 32, so that the unlocking portion 31 applies a force to the locking member 4 to retract the locking protruding stand 41 into the housing 6.

Specifically, as shown in FIG. 7-8, the left activated end **222*b* and the right activated end 222*a* bending towards one side of the unlocking member 3 are arranged on the driving protruding stand 222 on the rotating shaft 221 of the indicating member 22, respectively, the bending end 32 of the unlocking member 3 bends towards one side of the button 2 and is positioned between the left activated end 222*b* and the right activated end 222*a*. As shown in FIG. 8, when the button 2 moves toward the inside of the circuit breaker to perform the closing operation, the inclined surface of the left activated end 222*b* of the indicating member 22 is in contact with the bending end 32 of the unlocking member 3 and rotates counterclockwise under the resistance of the bending end 32 of the unlocking member 3, so that operators can see the region of the indicating portion corresponding to the closing state in the observation window 212, and the closing and opening identifier displayed by the indicating portion corresponds to the color identifier representing the closing and opening state. As shown in FIG. 7, when the button 2 is pulled in the direction away from the circuit breaker to perform the opening operation, thus the circuit breaker is in the opening state, the bending end 32 is positioned between the left activated end 222*b* and the right activated end 222*a*, and the inner inclined surface of the right activated end 222*a* touches the right side of the bending end 32, generating a force to cause the indicating member to rotate clockwise around the rotating shaft 221. The indicating member inside the button member 21 is driven by the bending end 32 of the unlocking member 3 to rotate to display the opening state, so that the observation window 212 can show the region corresponding to the opening state, and the closing and opening identifier displayed by the indicating portion corresponds to the color identifier representing the closing and opening state. After the circuit breaker is opened, when the circuit breaker needs to be detached from the installation cabinet, the right activated end 222*a* of the indicating member 22 applies a force on the lower end surface of the bending end 32 of the unlocking member 3, the unlocking member 3 rotates clockwise under the applied force, so as to drive the extending end 31 thereof to act upon the linkage unlocking portion 43 of the locking member 4, so that the locking protruding stand 41** retracts into the circuit breaker, and the circuit breaker can be safely detached from the operating position of the cabinet.

As shown in FIG. 5, a preferred embodiment of the locking member 4 and the unlocking member 3. The locking member 4 and the unlocking member 3 are arranged between the button mechanism and the limiting hole 61, the locking member 4 is arranged opposite to the driving member 5, and the unlocking member 3 is arranged opposite to the button 2. The locking member 4 has the upper portion close to the limiting hole 61, provided with the locking protruding stand 41, and the lower portion close to the button mechanism, provided with the protruding limiting end 42 extending downwards, the linkage unlocking portion 43 is arranged on one side, close to the unlocking member 3, of the locking protruding stand 41, and the linkage unlocking portion 43 is a step positioned on one side of the locking protruding stand 41. The locking member 4 is slidably installed in the locking member groove on the housing 6, the elastic member 44 has one end acting upon the lower portion of the locking member 4, and the other end acting upon the housing 6, the lower portion of the locking member 4 is provided with a spring connecting portion, the elastic member 44 enables the locking member 4 to be installed on the housing 6 by means of a linear sliding pair, the movement of the locking member 4 is a non-rotating transnational motion, and the direction of the linear movement thereof is perpendicular to the installation-insertion direction of the circuit breaker. The unlocking member 3 is rotatably arranged inside the housing 6, the unlocking member 3 is provided with the unlocking portion 31 fitting with the locking member 4 in the direction pointing to the locking member 4, the other end of the unlocking member 3 is provided with the bending end 32, one side of the bending end 32 is provided with the unlocking member rotating shaft 33, the bending end 32 is a convex square stand and corresponds to the position of the unlocking member rotating shaft 33.

As shown in FIG. 6, there is another embodiment of the locking member 4 and the unlocking member 3. The upper portion of the locking member 4 close to the limiting hole 61 is provided with the locking protruding stand 41, and the lower portion of the locking member 4 close to the button mechanism is provided with the limiting end 42 extending downwards, the linkage unlocking portion 43 is arranged on one side, close to the unlocking member 3, of the locking protruding stand 41, the linkage unlocking portion 43 is a groove positioned on one side of the locking protruding stand 41, the unlocking portion of the unlocking member 3 is inserted into the groove of the linkage unlocking portion 43, the unlocking member 3 is rotatably arranged inside the housing 6, the unlocking member 3 is provided with the unlocking portion 31 fitting with the locking member 4 in the direction pointing to the locking member 4, the unlocking member 3 has the middle provided with the unlocking member rotating shaft, and the other end provided with the bending end 32.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

What is claimed is:

1. A plug-in circuit breaker comprising a housing provided with a limiting hole, a button mechanism having a closing position and an opening position corresponding to a closing state and an opening state, and an operating mechanism actuated by said button mechanism to perform a closing/opening operation, wherein said plug-in circuit breaker includes a locking member arranged inside said housing, said locking member is provided with a locking protruding stand opposite to said limiting hole, when said button mechanism is in the closing position, said locking protruding stand of said locking member extending out of said limiting hole and limited by said button mechanism cannot retract into said housing;

when said button mechanism is in the opening position, said locking protruding stand of said locking member extends out of said limiting hole, applying an external force on said locking member for retraction, thus said locking protruding stand of said locking member can retract into said housing, and said locking member limits said button mechanism to perform the closing operation, so that the plug-in circuit breaker cannot be closed.

2. The plug-in circuit breaker according to claim 1, wherein said locking member is installed inside said housing in a linear movement mode, a direction of linear movement thereof is perpendicular to an installation-insertion direction of the plug-in circuit breaker, an elastic member is connected between said locking member and said housing, an elastic force of said elastic member actuates said locking protruding stand of said locking member to extend out of said housing, when said button mechanism is in the opening position, an external force for retraction is applied on said locking member, so that said locking member overcomes the elastic force of said elastic member to retract said locking protruding stand into said housing.

3. The plug-in circuit breaker according to claim 2, wherein an upper portion of said locking member close to said limiting hole is provided with said locking protruding stand, and a lower portion of said locking member close to said button mechanism is provided with a limiting end extending downwards, a linkage unlocking portion is arranged on one side of said locking protruding stand.

4. The plug-in circuit breaker according to claim 1, wherein said button mechanism includes a button, a connecting rod and a driving member, said button drives said driving member through said connecting rod, said driving member is rotatably arranged inside said housing and connected with said operating mechanism.

5. The plug-in circuit breaker according to claim 4, wherein said locking member is provided with a limiting end, said driving member is provided with a limiting surface, when said button mechanism is in the closing position, said limiting surface abuts against said limiting end, so that said locking protruding stand of said locking member cannot retract into said housing; when said button mechanism is in the opening position, said limiting surface is dislocated off said limiting end to release hindrance fit, when an external force is applied to said locking member, said locking protruding stand of said locking member retracts into said housing.

6. The plug-in circuit breaker according to claim 4, wherein said locking member is provided with a limiting end, said driving member is further provided with a driving limiting portion, when said button mechanism is in the opening position, said driving limiting portion is opposite to said limiting end, when said locking protruding stand of said locking member retracts into said housing, said limiting end is in limit fit with said driving limiting portion to hinder said driving member from rotating in a closing direction, so as to prevent said button mechanism from switching from the opening position to the closing position.

7. The plug-in circuit breaker according to claim 4, wherein said plug-in circuit breaker further includes an unlocking member, said unlocking member is provided with an unlocking portion fitting with said locking member, after the plug-in circuit breaker is opened, wherein said button mechanism includes a button and pulling said button enables said button mechanism to actuate said unlocking member to act, said unlocking portion of said unlocking member applies a force to said locking member to retract said locking protruding stand into said housing.

8. The plug-in circuit breaker according to claim 7, wherein said unlocking member is rotatably arranged inside said housing, said unlocking member is provided with said unlocking portion fitting in a direction pointing to said locking member, another end of said unlocking member is provided with a bending end, thus said button mechanism actuates said unlocking member to rotate by means of said bending end, so as to enable said unlocking portion to apply a force to said locking member, so that said locking protruding stand retracts into said housing.

9. The plug-in circuit breaker according to claim 8, wherein said button includes a button member used for operation and an indicating member inside said button member, said indicating member includes a rotating shaft, a display end surface, and a driving protruding stand arranged on said rotating shaft, said display end surface is provided with an indicating portion used for identifying the closing and opening, inside of said button member is internally provided with a cavitated installing hole, an operation end face of said button member is provided with an observation window communicating with said installing hole, said indicating member is installed inside said installing hole of said button member by means of said rotating shaft and can swing around the rotary shaft, such swinging action drives the indicating portion on said display end surface to move under said observation window, the corresponding closing and opening state are indicated by moving the indicating portion into said observation window, said driving protruding stand reveals an outer side of said button member, said unlocking member is provided with the corresponding bending end, a bending direction of said bending end faces one side of said driving protruding stand of said indicating member; during the circuit breaker closing, said button moves toward inside of said housing, and said driving protruding stand fits with said bending end, enabling said indicating member to rotate, so that a region of the indicating portion on said display end surface corresponding to the closing state faces said observation window; after the circuit breaker is opened, said button is pulled away from the circuit breaker, said driving protruding stand actuates said unlocking member to rotate by means of said bending end, so that said unlocking portion applies a force to said locking member to retract said locking protruding stand into said housing.

10. The plug-in circuit breaker according to claim 4, wherein an unlocking arm fitting with said locking member is arranged on said button, after the plug-in circuit breaker is opened, said button is continuously pulled, so that said unlocking arm applies a force to said locking member to retract said locking protruding stand into said housing.

* * * * *